United States Patent

Citta et al.

[11] Patent Number: 5,949,768
[45] Date of Patent: Sep. 7, 1999

[54] TWO TIER ADAPTIVE RANDOM ACCESS PROTOCOL

[75] Inventors: Richard W. Citta, Oak Park; Jingsong Xia, Mundelein, both of Ill.

[73] Assignee: Zenith Electronics Corporation, Glenview, Ill.

[21] Appl. No.: 08/831,236

[22] Filed: Apr. 2, 1997

[51] Int. Cl.$^6$ ........................................ H04B 7/212
[52] U.S. Cl. ......................... 370/322; 370/348; 370/439; 370/443
[58] Field of Search ........................ 340/825.07, 825.08; 370/322, 348, 439, 443, 449, 462, 336, 437, 438, 442, 461, 447, 448

[56] References Cited

U.S. PATENT DOCUMENTS

| 5,640,395 | 6/1997 | Hamalainen et al. | 370/322 |
| 5,644,576 | 7/1997 | Bauchot et al. | 370/437 |

*Primary Examiner*—Jeffery A. Hofsass
*Assistant Examiner*—Mitchell Slavitt

[57] ABSTRACT

A communication system has a plurality of stations which communicate data in a data frame having a plurality of slots including data slots DS, new message minislots MS0, and/or old message minislots MS1. A master station determines new and old message range parameters R0 and R1 which are based upon colliding reservation requests in a data frame. The master station determines the new and old message minislots MS0 and MS1 according to reservation request activity. The master station transmits the new and old message range parameters R0 and R1, and a MAP defining the new and old message minislots MS0 and MS1 to a plurality of slave stations. Each slave station independently determines transmission parameters N0 and N1 within the corresponding new and old message range parameters R0 and R1. Each slave station transmits a new reservation request to the master station if its transmission parameter N0 corresponds to one of the new message minislots MS0 and transmits an old reservation request to the master station if its transmission parameter N1 corresponds to one of the old message minislots MS1.

52 Claims, 4 Drawing Sheets

| Segmentation Type | Value |
|---|---|
| Single Segment Message (SSM) | 00 |
| Beginning of Message (BOM) | 01 |
| Continuation of Message (COM) | 10 |
| End of Message | 11 |

TWO TIER ADAPTIVE RANDOM ACCESS PROTOCOL

RELATED APPLICATIONS

This application discloses an invention similar to the inventions disclosed in the following applications: U.S. patent application Ser. No. 08/734,909 filed Oct. 22, 1996; U.S. patent application Ser. No. 08/777,216 filed Dec. 27, 1996; and, U.S. patent application Ser. No. 08/777,217 filed Dec. 27, 1996.

TECHNICAL FIELD OF THE INVENTION

The present invention relates to a protocol for a communication system in which multiple stations share access to a common communication channel according to a time division multiple access format.

BACKGROUND OF THE INVENTION

Communication systems typically include a plurality of stations connected to one another over a common communication channel. For example, in a community antenna television (CATV) system, a headend is connected by a cable to a plurality of subscriber stations. The cable supports downstream communication from the headend to the subscriber stations and upstream communication from the subscriber stations to the headend. Data, which is transmitted between the headend and the subscriber stations, is transmitted in data frames. Accordingly, when the headend communicates with a subscriber station, the headend transmits a downstream data frame to the subscriber station, and when a subscriber station communicates with the headend, the subscriber station transmits an upstream data frame to the headend.

In such a CATV system, the headend and the subscriber stations must share the resources of the cable in some manner. For example, downstream and upstream communications are typically allocated to different frequency ranges. In a sub-split allocation, downstream communications are allocated to a frequency range between 54 MHz and 750 MHz and above, while the upstream communications are allocated to a frequency range below 42 MHz. In a mid-split allocation, downstream communications are allocated to a frequency range of 162 MHz and above, while upstream communications are allocated to a frequency range between 5 to 100 MHz. In a high-split allocation, downstream communications are allocated to a frequency range of 234 MHz and above, while upstream communications are allocated to a frequency range between 5 MHz and 174 MHz.

Moreover, the subscriber stations must also share the resources of the cable in some manner. In a time division multiple access (TDMA) CATV system, the subscriber stations typically share the cable by transmitting data during uniquely assigned and non-overlapping time periods. In a frequency division multiple access (FDMA) CATV system, the subscriber stations share the cable by dividing up the available upstream frequency bandwidth into numerous narrow frequency channels and by allocating to each subscriber station its own corresponding narrow frequency band. In a code division multiple access (CDMA) CATV system, the subscriber stations share the cable by multiplying their data messages by corresponding assigned code words and then transmitting the result.

A conventional TDMA system, which assigns each subscriber station to a unique time slot, avoids collisions of data transmitted by the subscriber stations but restricts the amount of data throughput from the subscriber stations to the headend. An FDMA system, which allocates to each subscriber station its own corresponding narrow frequency band, similarly restricts throughput because the number of frequency bands allocated to the subscriber stations is limited. CDMA system likewise limits throughput over a communication cable because the number of code words which are available to be assigned to subscriber stations is limited.

In order to increase throughput of the data transmitted by the subscriber stations to the headend of a CATV system, it is known to divide the upstream data frame which supports communication from the subscriber stations to the headend into a number of minislots and data slots. Those subscriber stations, which have data to transmit to the headend, are required to insert a reservation request in a minislot of the current upstream data frame (i.e., the upstream data frame at discrete time n). This reservation request requests the headend to reserve data slots in a subsequent upstream data frame (e.g., the upstream data frame at discrete time n+1) for use by those subscriber stations.

Because the number of minislots in an upstream data frame utilized by such current systems is limited, contention between subscriber stations for access to the limited number of minislots results in frequent collisions between reservation requests. However, it is hoped that at least some reservation requests will be successfully transmitted by subscriber stations to the headend without collision. Therefore, it is generally thought that eventually all subscriber stations will be able to transmit their data to the headend in data slots reserved for that purpose. Yet, because the number of minislots in such systems is limited and fixed, the throughput in such a system is correspondingly limited.

The present invention is directed to an adaptive random access system which adaptively varies the number of minislots in a data frame in order to increase data through-put.

SUMMARY OF THE INVENTION

In accordance with one aspect of the present invention, a receiver comprises receiving means, transmission parameter generating means, and transmitting means. The receiving means receives a downstream data frame having range parameters R0 and R1 and a minislot parameter MAP. The minislot parameter MAP defines new message minislots MS0 and old message minislots MS1 for a subsequent upstream data frame. The transmission parameter generating means generates a transmission parameter N1 within a range defined by the range parameter R1, and generates a transmission parameter N0 within a range defined by the range parameter R0. The transmission parameter generating means generates the transmission parameter N1 when the receiver has an old message reservation request to re-transmit, and the transmission parameter generating means generates the transmission parameter N0 when the receiver has a new message reservation request to transmit. The transmitting means transmits the old message reservation request in a minislot of an upstream data frame if the transmission parameter N1 corresponds to one of the old message minislots MS1, and transmits the new message reservation request in a minislot of an upstream data frame if the transmission parameter N0 corresponds to one of the new message minislots MS0.

In accordance with another aspect of the present invention, a method of transmitting reservation requests, which is implemented by a receiver of a communication system, comprises the following steps: a) receiving a downstream data frame having range parameters R0 and R1 and a minislot parameter MAP such that the minislot parameter MAP defines minislots MS0 and MS1; b) if the receiver has a previously transmitted reservation request to re-transmit, generating a transmission parameter N1 within a range defined by the range parameter R1; c) if the receiver has a new reservation request to transmit, generating a transmission parameter N0 within a range defined by the range parameter R0; d) re-transmitting the previously transmitted reservation request in a minislot of an upstream data frame if the transmission parameter N1 corresponds to one of the minislots MS1; and e) transmitting the new reservation request in a minislot of an upstream data frame if the transmission parameter N0 corresponds to one of the minislots MS0.

In accordance with yet another aspect of the present invention, a communication system has a plurality of stations which communicate data in a data frame having a plurality of slots, and the plurality of slots include data slots RDS(n+1) and/or minislots MS(n+1). The communication system comprises range parameter determining means, minislot parameter determining means, first station transmitting means, transmission parameter determining means, and second station transmitting means. The range parameter determining means is at a first station and determines a new message range parameter R0(n+1) and an old message range parameter R1(n+1). The minislot parameter determining means is at the first station and determines a minislot parameter MAP defining new message minislots MS0(n+1) and old message minislots MS1(n+1). The first station transmitting means is at the first station and transmits the new message range parameter R0(n+1), the old message range parameter R1(n+1), and the minislot parameter MAP to a second station. The transmission parameter determining means is at the second station and determines a new message transmission parameter N0 within a range corresponding to the new message range parameter R0(n+1) and an old message transmission parameter N1 within a range corresponding to the old message range parameter R1(n+1). The second station transmitting means is at the second station transmits a new reservation request to the first station if the new message transmission parameter N0 corresponds to one of the new message minislots MS0(n+1), and a previously transmitted reservation request to the first station if the old message transmission parameter N1 corresponds to one of the old message minislots MS1(n+1).

In accordance with a further aspect of the present invention, a transmitter comprises upstream data frame receiving means, range parameter determining means, minislot parameter determining means, and transmitting means. The upstream data frame receiving means receives an upstream data frame n at discrete time n. The range parameter determining means determines a new message range parameter R0(n+1) and an old message range parameter R1(n+1). The minislot parameter determining means determines a minislot parameter MAP defining new message minislots MS0(n+1) and old message minislots MS1(n+1). The minislot parameter MAP at least partially defines an upstream data frame n+1 at discrete time n+1. The transmitting means transmits the new message range parameter R0(n+1), the old message range parameter R1(n+1), and the minislot parameter MAP.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
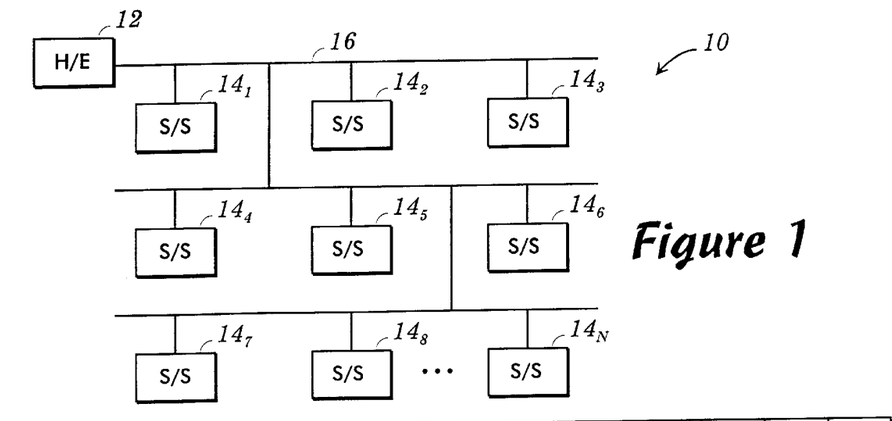
FIG. 1 is a schematic diagram of a CATV system which includes a headend connected to a plurality of subscriber stations by way of a cable and which is exemplary of a communication system configured in accordance with the present invention.

FIG. 1 illustrates a CATV system 10 which includes a headend 12, a plurality of subscriber stations $14_1$–$14_n$, and a cable 16 which interconnects the headend 12 and the subscriber stations $14_1$–$14_n$. The headend 12 may be of conventional hardware design incorporating a processor which may be programmed to support downstream communication over the cable 16 in accordance with the present invention. Similarly, the subscriber stations $14_1$–$14_n$ may be of conventional hardware design each incorporating a processor which may be programmed to support upstream communications over the cable 16 in accordance with the present invention.

When the subscriber stations $14_1$–$14_n$ have data to communicate to the headend 12 over the cable 16, those subscriber stations first make a reservation request. In making a reservation request, the subscriber stations $14_1$–$14_n$ contend with one another for a limited but variable number of minislots in the upstream data frame because minislots carry the reservation requests from the subscriber stations $14_1$–$14_n$ to the headend 12. With respect to those reservation requests which are successfully received by the headend 12 (i.e., received by the headend 12 in minislots in which there are no collisions), the headend 12 acknowledges the reservation request by way of an acknowledgement transmitted by the headend 12 to the successful subscriber stations $14_1$–$14_n$. Accordingly, the upstream data frame is divided into slots S some or most of which are subdivided into minislots MS such that all contention and reservation activity takes place in the minislots of the upstream data frame and all data transmission takes place in data slots DS which are un-subdivided ones of the slots S.

The split between minislots and data slots is specified by the headend 12 in the downstream data frame. In this regard, the downstream data frame contains parameters which determine the number of minislots and the number of data slots in the next upstream data frame. The subscriber stations $14_1$–$14_n$ use these parameters in order to make a decision as to whether they can transmit reservation requests.

Accordingly, the subscriber station $14_1$–$14_n$ contend for the bandwidth of the upstream channel. A successful reservation request results in the headend 12 allocating one or more data slots, based on availability, to each of the subscriber stations which had transmitted successful reservation requests. The number of data slots which are available to any one subscriber station depends on the number of subscriber stations making successful reservation requests.

For example, the sizes of the upstream and downstream data frames may be equal, may be fixed, and may be defined, for example, to have a size equal to at least the sum of the headend processing time and the round trip transmission delay of the cable 16.

Figures 2, 3, 4:
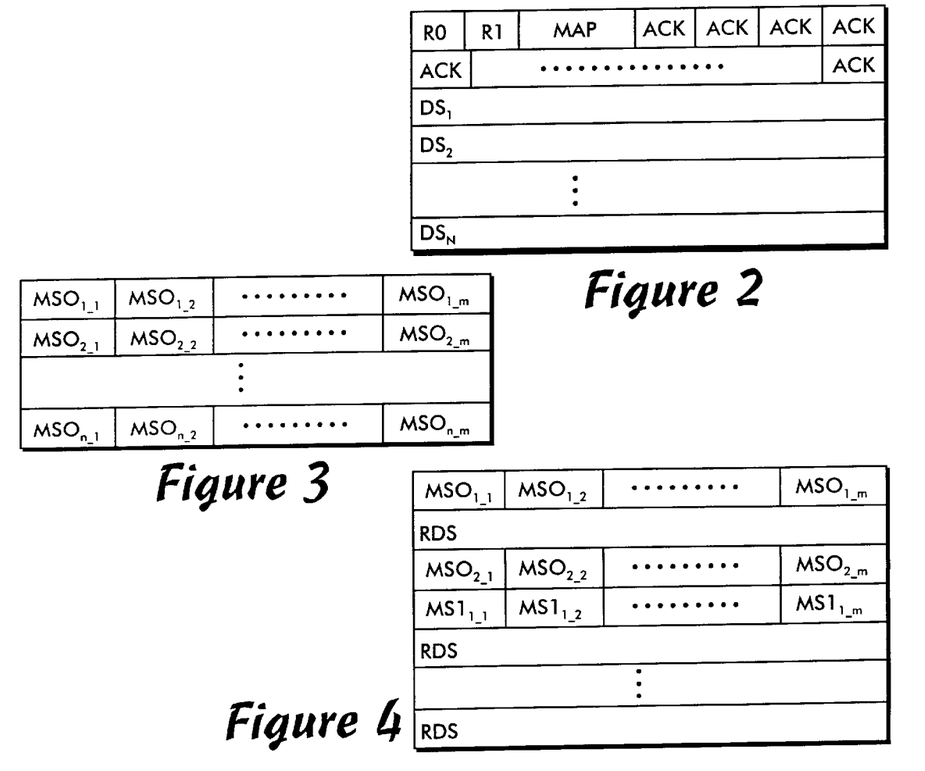
FIG. 2 illustrates a downstream data frame transmitted by the headend to the subscriber stations of FIG. 1.
FIGS. 3–6 illustrate examples of upstream data frames which correspond to the downstream data frame shown in FIG. 2.

An exemplary downstream data frame is illustrated in FIG. 2. Each such downstream data frame has four sections. The first section contains two range parameters R0 and R1. The range parameter R0 may be used by those subscriber stations $14_1$–$14_n$ which have new messages to transmit to the headend 12 and, therefore, is referred to hereinafter as the new message range parameter R0. A new message is a message for which a reservation request has not been previously transmitted. The range parameter R1 may be used by those subscriber stations $14_1$–$14_n$ which have old messages to transmit to the headend 12 and, therefore, is referred to hereinafter as the old message range parameter R1. An old message is a message for which a reservation request has been previously transmitted. Accordingly, the old message parameter R1 may be used by those subscriber stations $14_1$–$14_n$ which are in a contention resolution state. A subscriber station is in the contention resolution state if that subscriber station previously transmitted a reservation request for a new message, but that subscriber station has not received from the headend 12 an acknowledgement of that previously transmitted reservation request (because, for example, the reservation request collided with one or more other reservation requests so that it was not successfully received by the headend 12). As will be described below, the subscriber stations $14_1$–$14_n$ use the new message range parameter R0 in order to determine when to transmit a reservation request related to a new message, and the subscriber stations $14_1$–$14_n$ use the old message range parameter R1 in order to determine when to re-transmit a reservation request related to a previously transmitted reservation request.

The second section of the downstream data frame contains a minislot parameter MAP. The minislot parameter MAP may be a map which defines which slots of the next upstream data frame are minislots and which slots are data slots. The minislot parameter MAP further defines which minislots are to be used by the subscriber stations $14_1$–$14_n$ when they are not in the contention resolution state (these minislots are referred to hereinafter as new message minislots MS0), and which minislots are to be used by the subscriber stations $14_1$–$14_n$ when they are in the contention resolution state (these minislots are referred to hereinafter as old message minislots MS1). Thus, the minislot parameter MAP may be considered to have has the following three parts: a data slot parameter DS to define which slots of the next upstream data frame are data slots; a new message minislot parameter MAP0 to define which of the minislots are new message minislots MS0; and, an old message minislot parameter MAP1 to define which of the minislots are old message minislots MS1. As will be evident from the description below in connection with FIG. 12, a subscriber station may have, at the same time, both a new reservation request and a previously transmitted reservation request to transmit.

This map is particularly useful if minislots and data slots are interspersed throughout the upstream data frames. Alternatively, the minislot parameter MAP may be boundaries which separates minislots and data slots in the upstream data frames and which further separates minislots between new message minislots MS0 and old message minislots MS1.

The third section of the downstream data frame is devoted to the acknowledgement of the reservation requests that are made by the subscriber stations $14_1$–$14_n$ to the headend 12 in a previous upstream data frame. Each acknowledgement field (ACK) may identify (i) the subscriber station to which an acknowledgement is given and (ii) the data slot or data slots which are reserved to the identified subscriber station and in which the identified subscriber station may transmit a reservation request to the headend 12.

The fourth section of the downstream data frame contains slots ($DS_1$–$DS_n$) which may be used by the headend 12 to communicate data to the subscriber stations $14_1$–$14_n$.

The upstream data frame is illustrated in FIGS. 3–6 under various load conditions. In the upstream channel, the subscriber stations $14_1$–$14_n$ use the minislot parameter MAP of the previous downstream data frame in order to define the next upstream data frame. The upstream data frame contains a plurality of slots. As shown in FIG. 3, all of the slots are subdivided into new message minislots MS0 during light load conditions (such as during system start up) in which few subscriber stations contend for the available minislots. A slot may be subdivided into a fixed number m of minislots. The new message and old message minislots MS0 and MS1 may be used by the subscriber stations in order to transmit reservation requests to the headend 12 under normal contention activity.

As indicated by FIG. 4, the number of minislots changes dynamically, as discussed below, dependent upon the extent of contention and of reservation requests in the reservation request queue at the headend 12. Thus, as shown in FIG. 4, after contention activity between the subscriber stations $14_1$–$14_n$ has taken place, some of the slots in the next upstream data frame are mapped as new message minislots MS0, some of the slots in the next upstream data frame are mapped as old message minislots MS1, and some of the slots in the next upstream data frame are mapped as data slots RDS (wherein the designation RDS means that the data slots are reserved to the subscriber stations which have successfully transmitted reservation requests). However, there may be relatively more minislots MS than data slots RDS. As illustrated in FIG. 4, new message and old message minislots MS0 and MS1 and data slots RDS may be mixed throughout the upstream data frame depending upon the map. However, if the minislot parameter is a boundary, then the new message minislots MS0, the old message minislots MS1, and the data slots RDS are segregated from one another in the upstream data frame.

Figure 5:
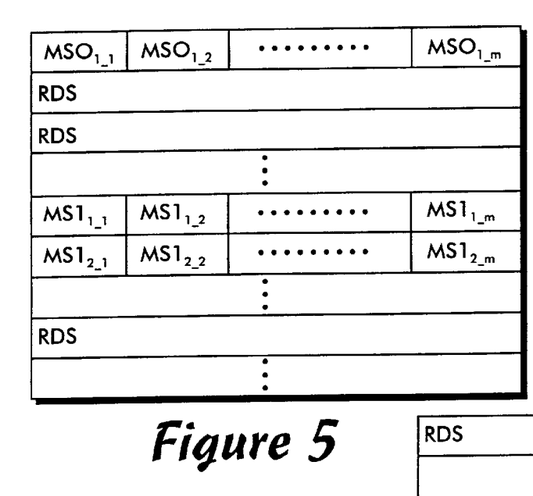
Figure 6:
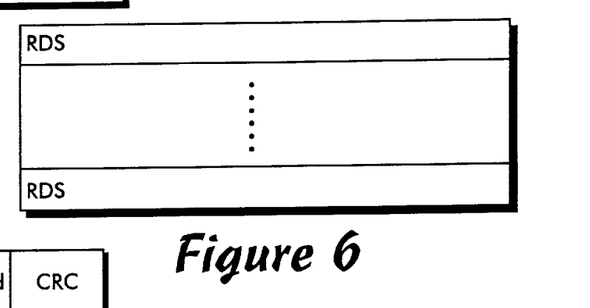

FIG. 5 illustrates an upstream data frame during heavy traffic conditions. The data frame has a decreased number of new message minislots MS0 and an increased number of data slots RDS and old message minislots MS1. FIG. 6 illustrates an upstream data frame as a result of blocking. Blocking is a condition which occurs when contention is so high that only a minimum number (such as zero) of minislots are provided in the upstream data frame.

Figure 7:
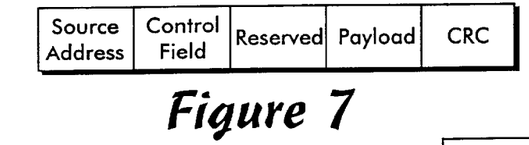
FIG. 7 illustrates a data slot format of the upstream data frame.
Figure 8:
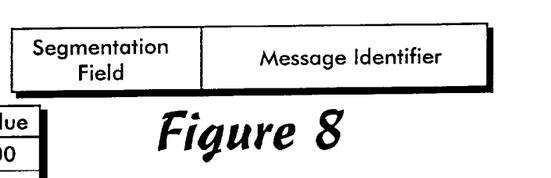
FIG. 8 illustrates a control field format for the data slot illustrated in FIG. 7.
Figure 9:
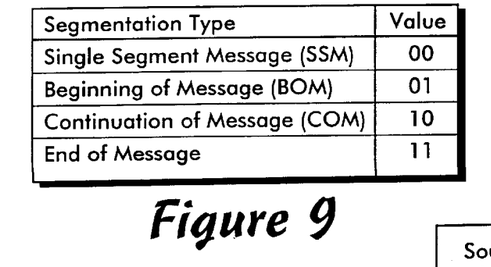
FIG. 9 illustrates a set of functions identified by a segmentation field of the control field format for the data slot illustrated in FIG. 7.

FIG. 7 illustrates the data which is inserted into a data slot RDS by a subscriber station. This data includes a source address representing the address of the sending subscriber station, a control field, reserved space, a payload, and error checking data. As shown in FIG. 8, which illustrates an example of the construction of the control field shown in FIG. 7, the control field may have two subfields. One of these subfields may be a segmentation subfield which carries information according to FIG. 9, for example. The other of these two subfields may be a message identifier field which contains other identifying information.

Figure 10:
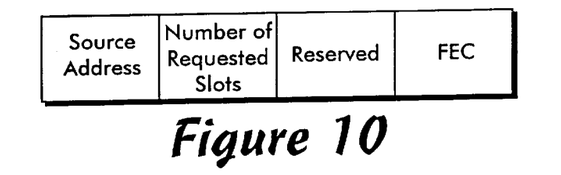
FIG. 10 illustrates a minislot format of the upstream data frame.

FIG. 10 illustrates the data inserted by a subscriber station into a minislot. This data includes the source address of the corresponding subscriber station, the number of reserved slots requested by the corresponding subscriber station, space reserved for future use, and forward error correction (FCC) information.

Formats other than those shown in FIGS. 7–10 may be used.

Because the headend 12 assigns data slots RDS to the subscriber stations $14_1$–$14_n$ based upon reservation requests inserted into minislots by the subscriber stations $14_1$–$14_n$, the data which is inserted into a data slot RDS as illustrated in FIG. 7 need not contain source addresses as long as the headend 12 maintains a record of the data slots which it assigns to the subscriber stations $14_1$–$14_n$.

Figures 11A, 11B:
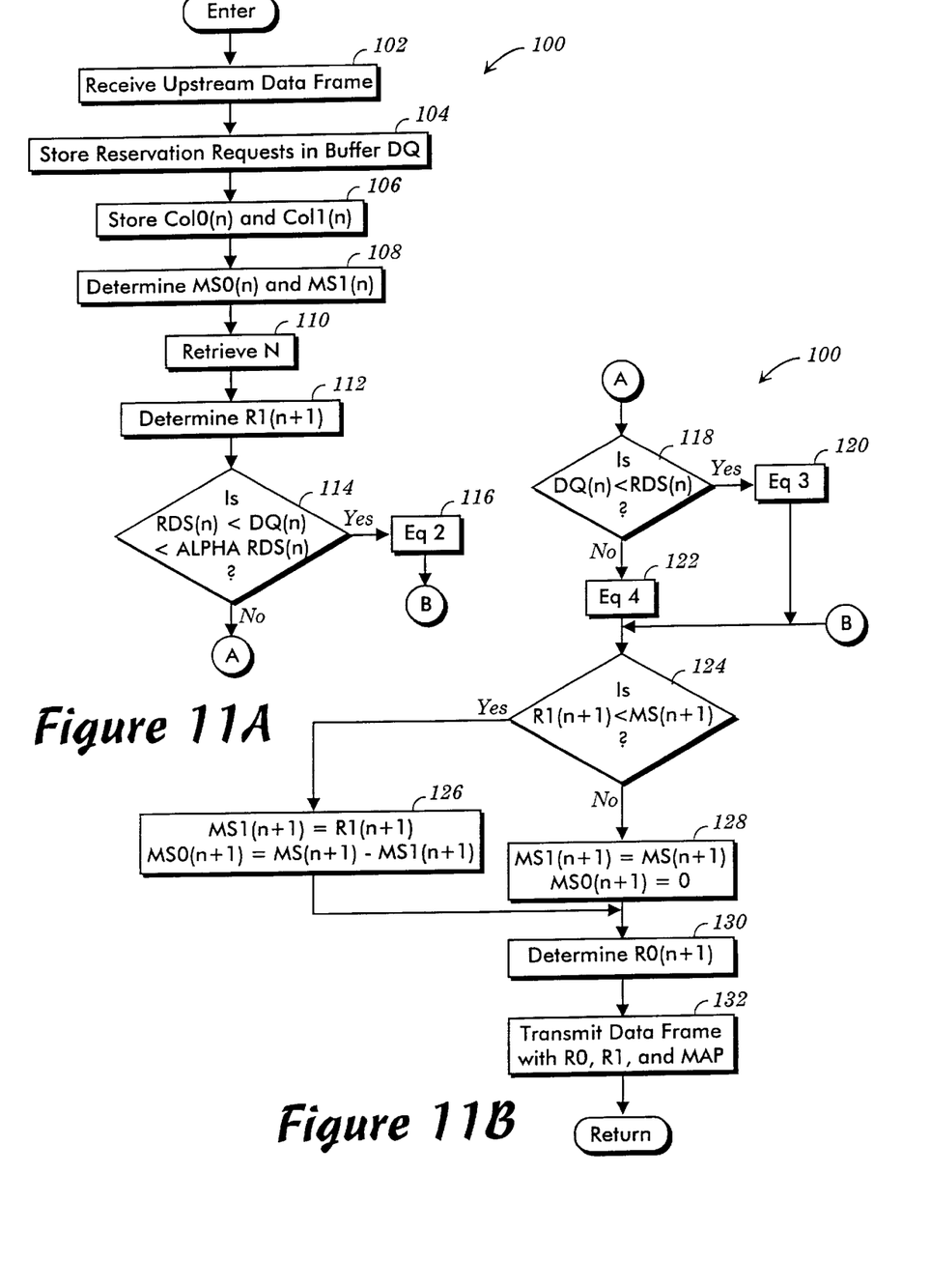
FIGS. 11A and 11B illustrate a program which is executed by the headend of FIG. 1 in an exemplary implementation of the present invention; and, FIG. 12 illustrates a program which is executed by each of the subscriber stations of FIG. 1 in the exemplary implementation of the present invention.

In determining (i) the number of new message and old message minislots MS0(n+1) and MS1(n+1) for the next upstream data frame (n+1) and (ii) the new message and old message range parameters R0(n+1) and R1(n+1) which are used by the subscriber stations $14_1$–$14_n$ to determine if they can transmit reservation requests in the next upstream data frame (n+1), the processor of the headend 12 executes a program 100, which is illustrated in FIGS. 11A and 11B.

The program 100 is entered each time that an upstream data frame is received by the headend 12. When the program 100 is entered, a block 102 receives an upstream data frame. The upstream data frame just received is designated herein as upstream data frame n and is received at discrete time n. A block 104 stores any successful reservation requests in this data frame in a reservation request queue (buffer) DQ. A block 106 stores (i) a variable Col0(n), which is set equal to the number of new message minislots MS0(n) in which reservation requests collided in the upstream data frame just received n, and (ii) a variable Col1(n), which is set equal to the number of old message minislots in which reservation requests collided in the upstream data frame n.

A block 108 determines the number of new message minislots MS0(n) and the number of old message minislots MS1(n) in the upstream data frame n just received. Because the headend 12 previously determined the number of new message minislots MS0(n) and the number of old message minislots MS1(n) for the upstream data frame n just received, the block 108 may merely retrieve the number of new message minislots MS0(n) and the number of old message minislots MS1(n) from memory. Alternatively, the headend 12 could count the number of new message minislots MS0(n) and the number of old message minislots MS1(n) in the upstream data frame n just received.

A block 110 retrieves a constant N from memory. The constant N is the total number of subscriber stations $14_1$–$14_n$ in the CATV system 10. A block 112 determines the new message range parameter R1(n+1) according the following equation:

$$R1(n+1) = \min\left\{N, R1(n) - MS1(n) + \frac{e-1}{e-2}(Col1(n) + Col0(n))\right\}, \quad (1)$$

where n indicates the upstream data frame just received, n+1 indicates the next upstream data frame, R1(n+1) is the old message range parameter for the next upstream data frame n+1, R1(n) is the old message range parameter for the upstream data frame n just received, N represents the total number of subscriber stations as retrieved by the block 110, MS1(n) is the number of old message minislots in the upstream data frame n just received as determined by the block 108, Col0(n) is the number of collided new message minislots MS0(n) in the upstream data frame n just received, Col1(n) is the number of collided old message minislots MS1(n) in the upstream data frame n just received, and e is 2.718281828 . . . .

A block 114 determines whether the CATV system 10 is in steady state. When the system is in steady state, the number of reservation requests DQ(n) stored in the reservation request queue DQ at the current discrete time n is greater than the number of data slots RDS(n) in the upstream data frame n just received by the block 102, but is less than this number of data slots RDS(n) multiplied by a constant α. If the system is in steady state, a block 116 determines the number of minislots MS(n+1) to be allocated to the next upstream data frame n+1 according to the following equation:

$$MS(n+1) = M = \frac{S}{\frac{k}{e} + \frac{1}{m}} \quad (2)$$

wherein S is the total number of slots in a data frame, m is the number of minislots into which a slot may be subdivided, e is 2.718281828 . . . , MS(n+1) is the number of minislots for the next upstream data frame n+1, k is the average number of data slots reserved by reservation requests, and M is the steady state number of minislots.

If the block 114 determines that the CATV system 10 is not in steady state, a block 118 determines whether the number of reservation requests DQ(n) in the reservation request queue DQ of the headend 12 at discrete time n is less than the number of data slots RDS(n) in the upstream data frame n just received. If so, a block 120 determines the number of minislots MS(n+1) to be allocated to the next upstream data frame n+1 according to the following equation:

$$MS(n+1) = m(S - DQ(n)) \quad (3)$$

wherein DQ(n) is the number of reservation requests DQ(n) in the reservation request queue DQ of the headend 12 at time n.

If the block 114 determines that the CATV system 10 is not in steady state, and if the block 118 determines that the number of reservation requests DQ(n) in the reservation request queue DQ of the headend 12 at discrete time n is not less than the number of data slots RDS(n) in the upstream data frame n just received, a block 122 determines the number of minislots MS(n+1) to be allocated to the next upstream data frame n+1 according to the following equation:

$$MS(n+1) = M - m\frac{DQ(n) - \alpha RDS(n)}{6} \quad (4)$$

where RDS(n) is the number of data slots in the upstream data frame just received.

A block 124 determines whether the old message range parameter R1(n+1), which is to be transmitted in the next upstream data frame n+1 and which was determined by the block 112, is less than the number of minislots MS(n+1), which is to be allocated to the next upstream data frame n+1 and which was determined according to one of the equations (2)–(4). If the old message range parameter R1(n+1) is less than the number of minislots MS(n+1), a block 126 determines the number of old message minislots MS1(n+1) and the number of new message minislots MS0(n+1) for the next upstream data frame n+1 according to the following equations:

$$MS1(n+1)=R1(n+1) \quad (5)$$

$$MS0(n+1)=MS(n+1)-MS1(n+1) \quad (6)$$

where R1(n+1) is determined by the block 112, and MS(n+1) is determined according to one of the equations (2)–(4).

On the other hand, if the old message range parameter R1(n+1) is not less than the number of minislots MS(n+1), a block 128 determines the number of old message minislots MS1(n+1) and the number of new message minislots MS0(n+1) for the next upstream data frame n+1 according to the following equations:

$$MS1(n+1)=MS(n+1) \quad (7)$$

$$MS0(n+1)=0 \quad (8)$$

where MS(n+1) is determined according to one of the equations (2)–(4).

Accordingly, as is evident from examining equations (5)–(8), MS(n+1) =MS0(n+1) +MS1(n+1).

A block 130 determines the new message range parameter R0(n+1) according the following equation:

$$R0(n+1) = \min\left\{N, \max\left\{MS0(n+1), R0(n)-MS0(n)+\frac{e-1}{e-2}Col0(n)+\frac{MS0(n)}{e}\right\}\right\}, \quad (9)$$

where n indicates the upstream data frame just received, n+1 indicates the next upstream data frame, R0(n+1) is the new message range parameter for the next upstream data frame n+1, R0(n) is the new message range parameter for the upstream data frame n lust received, N represents the total number of subscriber stations as retrieved by the block 110, MS0(n+1) is the number of new message minislots in the next upstream data frame n+1 as determined by either the block 126 or the block 128, MS0(n) is the number of new message minislots in the upstream data frame n as determined by the block 108, Col0(n) is the number of collided new message minislots MS0(n) in the upstream data frame n just received, and e is 2.718281828 . . . .

When the new message range parameter R0(n+1) has been determined by the block 130, the old message range parameter R1(n+1) has been determined by the block 112, the number of new message minislots MS0(n+1) in the next upstream data frame n+1 has determined by either the block 126 or the block 128, and the number of old message minislots MS1(n+1) in the next upstream data frame n+1 has determined by either the block 126 or the block 128, a block 132 transmits the next downstream data frame which includes (i) the new message and old message range parameters R0(n+1) and R1(n+1), (ii) the minislot parameter MAP which defines the portions of the next upstream data frame n+1 devoted to new message minislots MS0(n+1), to old message minislots MS(n+1), and/or to data slots RDS, (iii) acknowledgements based on some or all of the reservation requests in the reservation request queue DQ, and (iv) any data for the subscriber stations. The number of data slots RDS(n+1) may be equal, for example, to S−MS(n+1).

Figure 12:
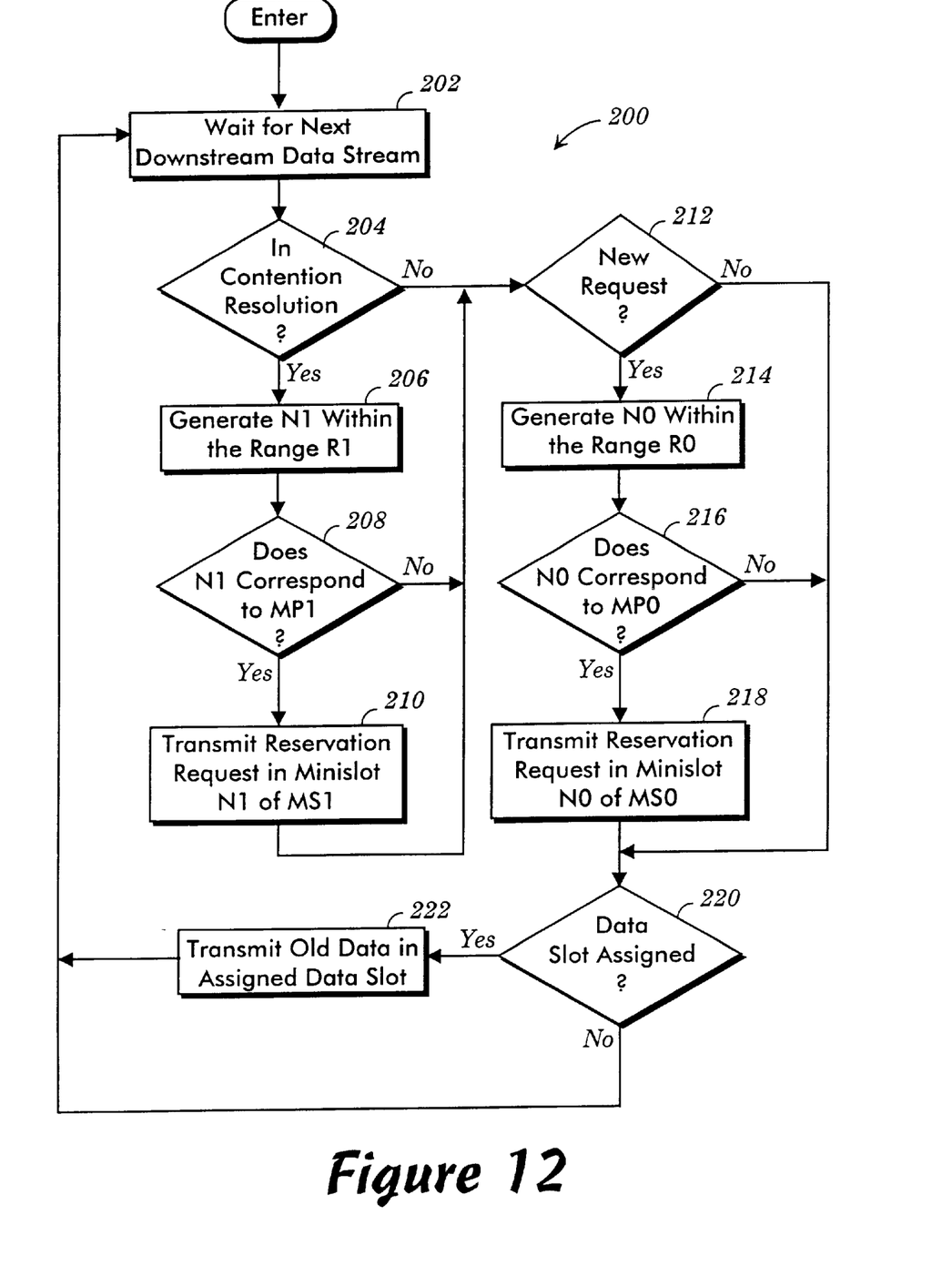

Each of the subscriber stations $14_1$–$14_n$ executes a program 200 as shown in FIG. 14. When the program 200 is entered, a block 202 causes the corresponding subscriber station to wait for the next downstream data frame which contains, inter alia, the new message and old message range parameters R0 and R1, the minislot parameter MAP, and acknowledgements (which include data slot allocations to the subscriber station). When the next downstream data frame is received, a block 204 determines whether the corresponding subscriber station is in a contention resolution state. A corresponding subscriber station is in the contention resolution state if it transmitted a reservation request in a previous upstream data frame and it did not receive an acknowledgement in the subsequent downstream data frame. If the corresponding subscriber station is in the contention resolution state, a block 206 generates a transmission parameter N1 within the range established by the old message range parameter R1, which is contained in the downstream data frame just received from the headend 12. The range established by the old message range parameter R1 may be the range between zero and R1 inclusive, the range between one and R1 inclusive, the range between R0 and R1, or the like. The transmission parameter N1 is used to determine whether its corresponding subscriber station is permitted to retransmit the previously transmitted reservation request to the headend 12. The transmission parameter N1 may be generated by the block 206 as a random number. Thus, because each subscriber station $14_1$–$14_n$, which is in the contention resolution state, generates its own transmission parameter N1 as a random value within the range established by the old message range parameter R1, the transmission probabilities of these subscriber stations $14_1$–$14_n$ are statistically spread along the interval of the range R1.

A block 208 determines whether the value of N1 generated by the block 206 corresponds to one of the old message minislots MS1 defined by the minislot parameter MAP contained in the downstream data frame just received from the headend 12. That is, if the minislot parameter MAP is a map, the block 208 determines whether the value of N1 is equal to one of the old message minislots MS1 defined in the map. On the other hand, if the minislot parameter MAP is a boundary, the block 208 determines whether the value of N1 is within the boundaries containing the old message minislots MS1.

If the block 208 determines that the value of N1 does not correspond to one of the old message minislots MS1 defined by the minislot parameter MAP, the subscriber station is not permitted to transmit the previously transmitted reservation request in the next upstream data frame, but must instead wait for the transmission of another upstream data frame within which to attempt, through execution of the blocks 204, 206, and 208, re-transmission of the previously transmitted reservation request. On the other hand, if the value of N1 corresponds to one of the old message minislots MS1 defined by the minislot parameter MAP, a block 210 retransmits the previously transmitted reservation request to the headend 12 in the old message minislot having the same value as the transmission parameter N1.

If the block 208 determines that the value of N1 generated by the block 206 does not correspond to one of the old message minislots MS1 defined by the minislot parameter MAP contained in the downstream data frame just received from the headend 12, or if the block 210 re-transmits the previously transmitted reservation request to the headend 12 but the subscriber station does not receive an acknowledgement of the re-transmitted previously transmitted reservation request, the subscriber station re-enters the contention resolution process (i.e., the blocks 204–210) during the next pass through the program 200 in order to determine whether it can again re-transmit that previously transmitted reservation request during the next upstream data frame.

If the block 204 determines that the corresponding subscriber station is not in a contention resolution state, or if the block 208 determines that the value of N1 generated by the block 206 does not correspond to one of the old message minislots defined by the minislot parameter MAP contained in the downstream data frame just received from the headend 12, or after the block 210 re-transmits the previously transmitted reservation request to the headend 12, a block 212 determines whether the subscriber station has a new message to transmit. A new message is a message for which a previous reservation request has not been made by the appropriate subscriber station. If the block 212 determines that the subscriber station has a new message to transmit, a block 214 generates a transmission parameter N0 within the range established by the new message range parameter R0, which is contained in the downstream data frame just received from the headend 12. The range established by the new message range parameter R0 may be the range between zero and R0 inclusive, the range between one and R0 inclusive, the range between R1 and R0, or the like. The transmission parameter N0 is used to determine whether its corresponding subscriber station is permitted to transmit to the headend 12 a new reservation request relative to the new message. The transmission parameter N0 may be generated by the block 214 as a random number. Thus, because each subscriber station $14_1$–$14_n$ generates its own transmission parameter N0 as a random value within the range established by the new message range parameter R0, the transmission probabilities of these subscriber stations $14_1$–$14_n$ are statistically spread along the interval of the range R0.

A block 216 determines whether the value of N0 generated by the block 206 corresponds to one of the new message minislots MS0 defined by the minislot parameter MAP contained in the downstream data frame just received from the headend 12. That is, if the minislot parameter MAP is a map, the block 216 determines whether the value of N0 is equal to one of the new message minislots MS0 defined in the map. On the other hand, if the minislot parameter MAP is a boundary, the block 208 determines whether the value of N0 is within the boundaries containing the new message minislots MS0.

If the block 216 determines that the value of N0 does not correspond to one of the new message minislots MS0 defined by the minislot parameter MAP, the subscriber station is not permitted to transmit the new reservation request in the next upstream data frame, but must instead wait for the transmission of another upstream data frame within which to attempt, through execution of the blocks 212, 214, and 216, transmission of the new reservation request. On the other hand, if the value of N0 corresponds to one of the new message minislots MS0 defined by the minislot parameter MAP, a block 218 transmits the new reservation request to the headend 12. If the subscriber station does not receive an acknowledgement of this new reservation request, the subscriber station enters the contention resolution process (i.e., the blocks 204–210) during the next pass through the program 200 in order to determine whether it can re-transmit that reservation request during the next upstream data frame.

If the block 212 determines that the corresponding subscriber station does have a new message to transmit, or if the block 216 determines that the value of N0 generated by the block 214 does not correspond to one of the new message minislots MS0 defined by the minislot parameter MAP contained in the downstream data frame just received from the headend 12, or after the block 218 transmits the new reservation request to the headend 12, a block 220 determines whether the downstream data frame just received has been assigned one or more data slots RDS in the next upstream data frame within which the subscriber station may transmit an old message. This message is a message for which a previous successful reservation request had been made by the appropriate subscriber station. If the block 220 determines that the downstream data frame just received has a data slot RDS in the next upstream data frame within which the subscriber station may transmit an old message, a block 222 inserts this message into the data slot reserved for this subscriber station.

If the block 220 determines that a data slot had not been reserved for the subscriber station, or after the block 222 inserts a message into a data slot reserved in response to a previous reservation request, the program 200 returns to the block 202 to await the next downstream data frame.

Accordingly, the present invention adaptively allocates channel resources dependent upon the amount of demand created by the subscriber stations for the upstream channel. As the number of subscriber stations having data to transmit to the headend 12 increases, the chance that collisions will occur in the upstream data frames also increases. As the number of collisions in the upstream data frames increases, the values of the new message and old message range parameters R0 and R1 are increased which tend to decrease the probability that a subscriber station will be able insert a reservation request in minislots of subsequent upstream data frames. Moreover, as the number of subscriber stations having data to transmit to the headend 12 increases, the number of reservation requests in the reservation request queue DQ of the headend 12 also increases. As the number of reservation requests in the reservation request queue DQ increases, the number of minislots that are allocated to subsequent upstream data frames decreases.

Similarly, as the number of subscriber stations having data to transmit to the headend 12 decreases, the chance that collisions will occur in the upstream data frames also decreases. As the number of collisions in the upstream data frames decreases, the values of the new message and old message range parameters R0 and R1 are decreased which tends to increase the probability that a subscriber station will be able insert reservation request in minislots of subsequent upstream data frames. Moreover, as the number of subscriber stations having data to transmit to the headend 12 decreases, the number of reservation requests in the reservation request queue DQ of the headend 12 also decreases. As the number of reservation requests in the reservation request queue DQ decreases, the number of minislots that are allocated to subsequent upstream data frames increases.

Thus, as the number of reservation requests increases, the headend 12 decreases the number of minislots allocated to subscriber stations in order to reduce the number of successful reservation requests being transmitted by the subscriber stations in the upstream data frames. Also, as the number of collisions in minislots of upstream data frames increases, the values of the new message and old message range parameters R0 and R1 are increased which has the effect of reducing the number of subscriber stations permitted to transmit reservation requests in the minislots which are allocated to subsequent upstream data frames. Accordingly, the minislot parameters MAP0 and MAP1 and the new message and old message range parameters R0 and R1 work together to adaptively regulate data traffic in the CATV system 10.

Certain modifications of the present invention have been discussed above. Other modifications will occur to those practicing in the art of the present invention. For example, as described above, each subscriber station determines its transmission parameters N1 and N0 as random numbers which are only constrained to fall within the ranges established by the new message and old message range paramaters R0 and R1. Instead, the transmission parameters N1 and N0 may be determined by each subscriber station on a pseudorandom basis or on any other basis which tends to spread the transmission parameters N1 and N0 of the subscriber stations throughout the ranges R0 and R1. Therefore, the random generation of the transmission parameters N1 and N0 should be understood to include not only random generation of the transmission parameters N1 and N0 but also pseudorandom generation of the transmission parameters N1 and N0 and generation of the transmission parameters N1 and N0 by similar methods.

Also, the size of the upstream and downstream data frames are described above as being fixed. However, the sizes of the upstream and downstream data frames may be variable so that the size of these data frames, for example, may be dependent upon traffic load.

Moreover, as described above, the new message and old message range parameters R0 and R1 are used by the subscriber stations in generating the transmission parameters N1 and N0 when the subscriber stations have data to transmit, regardless of the priority of that data. Alternatively, new message and old message range parameters $R0_L$ and $R1_L$ may be used by the subscriber stations in generating corresponding transmission parameters $N1_L$ and $N0_L$ when the subscriber stations have low priority data to transmit, and larger new message and old message range parameters $R0_H$ and $R1_H$ may be used by the subscriber stations in generating corresponding transmission parameters $N0_H$ and $N1_H$ when the subscriber stations have high priority data to transmit. The transmission parameters $N0_L$ and $N1_L$ corresponding to the new message and old message range parameters $R0_L$ and $R1_L$ then determine if the subscriber stations can transmit low priority data, and the transmission parameters $N0_H$ and $N1_H$ corresponding to the new message and old message range parameters $R0_H$ and $R1_H$ then determine if the subscriber stations can transmit high priority data. Accordingly, the subscriber stations have a greater chance of successfully transmitting a reservation request when they have high priority data to transmit.

Furthermore, the present invention has been specifically described in connection with the transmission of data in a CATV system. However, the present invention is useful in connection with the transmission of data in other types of systems.

Also, although the data slots of the upstream data frames discussed above are described only as reserved data slots, it should be clear that the data slots of an upstream data frame may be used for purposes other than as reserved data slots.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A receiver comprising:
    receiving means for receiving a downstream data frame having range parameters R0 and R1 and a minislot parameter MAP, wherein the minislot parameter MAP defines new message minislots MS0 and old message minislots MS1 for a subsequent upstream data frame;
    transmission parameter generating means for generating a transmission parameter N1 within a range defined by the range parameter R1 and for generating a transmission parameter N0 within a range defined by the range parameter R0, wherein the transmission parameter generating means generates the transmission parameter N1 when the receiver has an old message reservation request to re-transmit, and wherein the transmission parameter generating means generates the transmission parameter N0 when the receiver has a new message reservation request to transmit; and,
    transmitting means for transmitting the old message reservation request in a minislot of an upstream data frame if the transmission parameter N1 corresponds to one of the old message minislots MS1, and for transmitting the new message reservation request in a minislot of an upstream data frame if the transmission parameter N0 corresponds to one of the new message minislots MS0.

2. The receiver of claim 1 wherein the subsequent upstream data frame has S slots, wherein the S slots include MS minislots and/or DS data slots, wherein MS may vary from $MS_{min}$ to $MS_{max}$, wherein MS=MS0+MS1, wherein DS may vary from $DS_{min}$ to $DS_{max}$, wherein $MS_{max}$=S, and wherein $DS_{min}$=0.

3. The receiver of claim 2 wherein $DS_{max}$=S, and wherein $MS_{min}$=0.

4. The receiver of claim 2 wherein $MS_{min}$=S–$DS_{max}$≠0.

5. The receiver of claim 1 wherein the subsequent upstream data frame has S slots, wherein the S slots include MS minislots and/or DS data slots, wherein MS may vary from $MS_{min}$ to $MS_{max}$, wherein MS=MS0+MS1, wherein DS may vary from $DS_{min}$ to $DS_{max}$, wherein $DS_{max}$=S, and wherein $MS_{min}$=0.

6. The receiver of claim 1 wherein the subsequent upstream data frame has S slots, wherein the S slots include MS minislots and/or DS data slots, wherein MS may vary from $MS_{min}$ to $MS_{max}$, wherein MS=MS0 +MS1, wherein DS may vary from $DS_{min}$ to $DS_{max}$, and wherein $MS_{min}$= S–$DS_{max}$≠0.

7. The receiver of claim 1 wherein the transmission parameters N1 and N0 are a random numbers.

8. A method of transmitting reservation requests, wherein the method is implemented by a receiver of a communication system, the method comprising the following steps:
    a) receiving a downstream data frame having range parameters R0 and R1 and a minislot parameter MAP, wherein the minislot parameter MAP defines minislots MS0 and MS1;
    b) if the receiver has a previously transmitted reservation request to re-transmit, generating a transmission parameter N1 within a range defined by the range parameter R1;
    c) if the receiver has a new reservation request to transmit, generating a transmission parameter N0 within a range defined by the range parameter R0;
    d) re-transmitting the previously transmitted reservation request in a minislot of an upstream data frame if the transmission parameter N1 corresponds to one of the minislots MS1; and,
    e) transmitting the new reservation request in a minislot of an upstream data frame if the transmission parameter N0 corresponds to one of the minislots MS0.

9. The method of claim 8 wherein the upstream data frame has S slots, wherein the S slots include MS minislots and/or DS data slots, wherein MS may vary from $MS_{min}$ to $MS_{max}$, wherein MS=MS0+MS1, wherein DS may vary from $DS_{min}$ to $DS_{max}$, wherein $MS_{max}$=S, and wherein $DS_{min}$=0.

10. The method of claim 9 wherein $DS_{max}$=S, and wherein $MS_{min}$=0.

11. The method of claim 9 wherein $MS_{min}$=S−$DS_{max}$≠0.

12. The method of claim 8 wherein the upstream data frame has S slots, wherein the S slots include MS minislots and/or DS data slots, wherein MS may vary from $MS_{min}$ to $MS_{max}$, wherein MS=MS0+MS1, wherein DS may vary from $DS_{min}$ to $DS_{max}$, wherein $DS_{max}$=S, and wherein $MS_{min}$=0.

13. The method of claim 8 wherein the upstream data frame has S slots, wherein the S slots include MS minislots and/or DS data slots, wherein MS may vary from $MS_{min}$ to $MS_{max}$, wherein MS=MS0+MS1, wherein DS may vary from $DS_{min}$ to $DS_{max}$, and wherein $MS_{min}$=S−$DS_{max}$≠0.

14. The method of claim 8 wherein step b) comprises the step of generating the transmission parameter N1 as a random number, and wherein step c) comprises the step of generating the transmission parameter N0 as a random number.

15. The method of claim 8 wherein step d) comprises the step of re-transmitting the previously transmitted reservation request in a minislot corresponding to the transmission parameter N1, and wherein step e) comprises the step of transmitting the new reservation request in a minislot corresponding to the transmission parameter N0.

16. The method of claim 15 wherein step b) comprises the step of generating the transmission parameter N1 as a random number, and wherein step c) comprises the step of generating the transmission parameter N0 as a random number.

17. A communication system having a plurality of stations which communicate data in a data frame having a plurality of slots, wherein the plurality of slots include data slots RDS(n+1) and/or minislots MS(n+1), and wherein the communication system comprises:

range parameter determining means at a first station for determining a new message range parameter R0(n+1) and an old message range parameter R1(n+1);

minislot parameter determining means at the first station for determining a minislot parameter MAP defining new message minislots MS0(n+1) and an old message minislots MS1(n+1);

first station transmitting means at the first station for transmitting the new message range parameter R0(n+1), the old message range parameter R1(n+1), and the minislot parameter MAP to a second station;

transmission parameter determining means at the second station for determining a new message transmission parameter N0 within a range corresponding to the new message range parameter R0(n+1), and for determining an old message transmission parameter N1 within a range corresponding to the old message range parameter R1(n+1); and, second station transmitting means at the second station for transmitting a new reservation request to the first station if the new message transmission parameter N0 corresponds to one of the new message minislots MS0(n+1), and for transmitting a previously transmitted reservation request to the first station if the old message transmission parameter N1 corresponds to one of the old message minislots MS1(n+1).

18. The communication system of claim 17 wherein the minislot parameter determining means determines minislots MS(n+1) as follows:

if RDS(n)<DQ(n)<αRDS(n), determine minislots MS(n+1) based upon the following equation:

$$MS(n+1) = M = \frac{S}{\frac{k}{e} + \frac{1}{m}};$$

if DQ(n)<RDS(n), determine minislots MS(n+1) based upon the following equation:

$$MS(n+1)=m(S-DQ(n));$$

and, if DQ(n)>αRDS(n), determine minislots MS(n+1) based upon the following equation:

$$MS(n+1) = M - m\frac{DQ(n) - \alpha RDS(n)}{6}$$

wherein RDS(n) is a number of minislots in a previous upstream data frame n, DO(n) corresponds to reservation activity at discrete time n, S is a total number of slots in a data frame, m is a number of minislots into which a slot may be subdivided, e is 2.718281828 . . . , MS(n+1) is a number of minislots for an upstream data frame n+1, MS(n+1)=MS0(n+1)+MS1(n+1), k is an average number of data slots reserved by reservation requests, α is a constant, and M is the steady state number of minislots.

19. The communication system of claim 17 wherein the range parameter determining means determines the old message range parameter R1(n+1) for discrete time n+1 according to the following equation:

$$R1(n+1) = \min\left\{N, R1(n) - MS1(n) + \frac{e-1}{e-2}(Col1(n) + Col0(n))\right\},$$

where n indicates an upstream data frame just received, n+1 indicates a next upstream data frame, R1(n+1) is the old message range parameter for the next upstream data frame n+1, R1(n) is an old message range parameter for the upstream data frame n just received, N represents a total number of stations in the communication system, MS1(n) is a number of old message minislots in the upstream data frame n just received, Col0(n) is a number of collided new message minislots MS0(n) in the upstream data frame n just received, Col1(n) is a number of collided old message minislots MS1(n) in the upstream data frame n just received, and e is 2.718281828 . . . .

20. The communication system of claim 19 wherein the minislot parameter determining means determines minislots MS(n+1) as follows:

if RDS(n)<DQ(n)<αRDS(n), determine minislots MS(n+1) based upon the following equation:

$$MS(n+1) = M = \frac{S}{\frac{k}{e} + \frac{1}{m}};$$

if DQ(n)<RDS(n), determine minislots MS(n+1) based upon the following equation:

$$MS(n+1)=m(S-DQ(n));$$

and, if DQ(n)>αRDS(n), determine minislots MS(n+1) based upon the following equation:

$$MS(n+1) = M - m\frac{DQ(n) - \alpha RDS(n)}{6}$$

wherein RDS(n) is a number of minislots in a previous upstream data frame n, DQ(n) corresponds to reservation activity at discrete time n, S is a total number of slots in a data frame, m is a number of minislots into which a slot may be subdivided, e is 2.718281828 ..., MS(n+1) is a number of minislots for an upstream data frame n+1, MS(n+1)=MS0(n+1)+MS1(n+1), k is an average number of data slots reserved by reservation requests, α is a constant, and M is the steady state number of minislots.

21. The communication system of claim 20 wherein the minislot parameter determining means determines the new message minislots MS0(n+1) and the old message minislots MS1(n+1) as follows:

if R1(n+1)<MS(n+1), determine the new message minislots MS0(n+1) and the old message minislots MS1(n+1) based upon the following equations:

$MS1(n+1)=R1(n+1)$ $MS0(n+1)=MS(n+1)-MS1(n+1)$ if R1(n+1) ≮ MS(n+1), determine the new message minislots MS0(n+1) and the old message minislots MS1(n+1) based upon the following equations:

$MS1(n+1)=MS(n+1)$ $MS0(n+1)=0$.

22. The communication system of claim 21 wherein the range parameter determining means determines the new message range parameter R0(n+1) for discrete time n+1 according to the following equation:

$$R0(n+1) = \min\left\{N, \max\left\{MS0(n+1), R0(n) - MS0(n) + \frac{e-1}{e-2}Col0(n) + \frac{MS0(n)}{e}\right\}\right\}$$

wherein MS0(n) is a number of old message minislots in the upstream data frame n just received.

23. The communication system of claim 17 wherein the range parameter determining means determines the old message range parameter R1(n+1) based upon an old message range parameter R1(n) for an upstream data frame n just received, based upon a total number of stations, based upon a number of old message minislots MS1(n) in the upstream data frame n just received, based upon a number of collided new message minislots MS0(n) in the upstream data frame n just received, and based upon a number of collided old message minislots MS1(n) in the upstream data frame n just received.

24. The communication system of claim 23 wherein the minislot parameter determining means determines minislots MS(n+1) based upon reservation request activity.

25. The communication system of claim 24 wherein the minislot parameter determining means determines the new message minislots MS0(n+1) and the old message minislots MS1(n+1) based upon R1(n+1) and MS(n+1).

26. The communication system of claim 25 wherein the range parameter determining means determines the new message range parameter R0(n+1) based upon a new message range parameter R0(n) for an upstream data frame n just received, based upon the total number of stations, based upon a number of new message minislots MS0(n) in the upstream data frame n just received, based upon MS0(n+1), and based upon a number of collided new message minislots MS0(n) in the upstream data frame n just received.

27. The communication system of claim 24 wherein the minislot parameter determining means determines the new message minislots MS0(n+1) and the old message minislots MS1(n+1) based upon MS(n+1).

28. The communication system of claim 27 wherein the range parameter determining means determines the new message range parameter R0(n+1) based upon a new message range parameter R0(n) for an upstream data frame n just received, based upon the total number of stations, based upon a number of new message minislots MS0(n) in the upstream data frame n just received, based upon MS0(n+1), and based upon a number of collided new message minislots MS0(n) in the upstream data frame n just received.

29. The communication system of claim 17 wherein the range parameter determining means determines the old message range parameter R1(n+1) based upon a number of collided minislots in the upstream data frame n just received.

30. The communication system of claim 29 wherein the minislot parameter determining means determines minislots MS(n+1) based upon reservation request activity.

31. The communication system of claim 30 wherein the minislot parameter determining means determines the new message minislots MS0(n+1) and the old message minislots MS1(n+1) based upon R1(n+1) and MS(n+1).

32. The communication system of claim 31 wherein the range parameter determining means determines the new message range parameter R0(n+1) based upon a number of collided minislots in the upstream data frame n just received.

33. The communication system of claim 30 wherein the minislot parameter determining means determines the new message minislots MS0(n+1) and the old message minislots MS1(n+1) based upon MS(n+1).

34. The communication system of claim 33 wherein the range parameter determining means determines the new message range parameter R0(n+1) based upon a number of collided minislots in the upstream data frame n just received.

35. A transmitter comprising:

upstream data frame receiving means for receiving an upstream data frame n at discrete time n;

range parameter determining means for determining a new message range parameter R0(n+1) and an old message range parameter R1(n+1);

minislot parameter determining means for determining a minislot parameter MAP defining new message minislots MS0(n+1) and an old message minislots MS1(n+1), wherein the minislot parameter MAP at least partially defines an upstream data frame n+1 at discrete time n+1; and, transmitting means for transmitting the new message range parameter R0(n+1), the old message range parameter R1(n+1), and the minislot parameter MAP.

36. The transmitter of claim 35 wherein the minislot parameter determining means determines minislots MS(n+1) as follows:

if RDS(n)<DQ(n)<αRDS(n), determine minislots MS(n+1) based upon the following equation:

$$MS(n+1) = M = \frac{S}{\frac{k}{e} + \frac{1}{m}} = \frac{Sem}{e + km};$$

if DQ(n)<RDS(n), determine minislots MS(n+1) based upon the following equation:

$$MS(n+1) = m(S-DQ(n));$$

and, if DQ(n)>αRDS(n), determine minislots Ms(n+1) based upon the following equation:

$$MS(n+1) = M - m\frac{DQ(n) - \alpha RDS(n)}{6}$$

wherein RDS(n) is a number of minislots in a previous upstream data frame n, DO(n) corresponds to reservation activity at discrete time n, S is a total number of slots in a data frame, m is a number of minislots into which a slot may be subdivided, e is 2.718281828 . . . , MS(n+1) is a number of minislots for an upstream data frame n+1, MS(n+1)=MS0(n+1)+MS1(n+1), k is an average number of data slots reserved by reservation requests, α is a constant, and M is the steady state number of minislots.

37. The transmitter of claim 35 wherein the range parameter determining means determines the old message range parameter R1(n+1) for discrete time n+1 according to the following equation:

$$R1(n+1) = \min\left\{N, R1(n) - MS1(n) + \frac{e-1}{e-2}(Col1(n) + Col0(n))\right\},$$

where n indicates an upstream data frame just received, n+1 indicates a next upstream data frame, R1(n+1) is the old message range parameter for the next upstream data frame n+1, R1(n) is an old message range parameter for the upstream data frame n just received, N represents a total number of stations in a network, MS1(n) is a number of old message minislots in the upstream data frame n just received, Col0(n) is a number of collided new message minislots MS0(n) in the upstream data frame n just received, Col1(n) is a number of collided old message minislots MS1(n) in the upstream data frame n just received, and e is 2.718281828 . . . .

38. The transmitter of claim 37 wherein the minislot parameter determining means determines minislots MS(n+1) as follows:

if RDS(n)<DQ(n)<αRDS(n), determine minislots MS(n+1) based upon the following equation:

$$MS(n+1) = M = \frac{S}{\frac{k}{e} + \frac{1}{m}} = \frac{Sem}{e + km};$$

if DQ(n)<RDS(n), determine minislots MS(n+1) based upon the following equation:

$$MS(n+1) = m(S-DQ(n));$$

and, if DQ(n)>αRDS(n), determine minislots MS(n+1) based upon the following equation:

$$MS(n+1) = M - m\frac{DQ(n) - \alpha RDS(n)}{6}$$

wherein RDS(n) is a number of minislots in a previous upstream data frame n, DO(n) corresponds to reservation activity at discrete time n, S is a total number of slots in a data frame, m is a number of minislots into which a slot may be subdivided, e is 2.718281828 . . . , MS(n+1) is a number of minislots for an upstream data frame n+1, MS(n+1)=MS0(n+1)+MS1(n+1), k is an average number of data slots reserved by reservation requests, α is a constant, and M is the steady state number of minislots.

39. The transmitter of claim 38 wherein the minislot parameter determining means determines the new message minislots MS0(n+1) and the old message minislots MS1(n+1) as follows:

if R1(n+1)<MS(n+1), determine the new message minislots MS0(n+1) and the old message minislots MS1(n+1) based upon the following equations:

$$MS1(n+1) = R1(n+1)$$

$$MS0(n+1) = MS(n+1) - MS1(n+1);$$

if R1(n+1) ≮ MS(n+1), determine the new message minislots MS0(n+1) and the old message minislots MS1(n+1) based upon the following equations:

$$MS1(n+1) = MS(n+1)$$

$$MS0(n+1) = 0.$$

40. The transmitter of claim 39 wherein the range parameter determining means determines the new message range parameter R0(n+1) for discrete time n+1 according to the following equation:

$$R0(n+1) = \min\left\{N, \max\left\{MS0(n+1), R0(n) - MS0(n) + \frac{e-1}{e-2}Col0(n) + \frac{MS0(n)}{e}\right\}\right\}$$

wherein MS0(n) is a number of old message minislots in the upstream data frame n just received.

41. The transmitter of claim 35 wherein the range parameter determining means determines the old message range parameter R1(n+1) based upon an old message range parameter R1(n) for an upstream data frame n just received, based upon a total number of stations in a network, based upon a number of old message minislots MS1(n) in the upstream data frame n just received, based upon a number of collided new message minislots MS0(n) in the upstream data frame n just received, and based upon a number of collided old message minislots MS1(n) in the upstream data frame n just received.

42. The transmitter of claim 41 wherein the minislot parameter determining means determines minislots MS(n+1) based upon reservation request activity.

43. The transmitter of claim 42 wherein the minislot parameter determining means determines the new message minislots MS0(n+1) and the old message minislots MS1(n+1) based upon R1(n+1) and MS(n+1).

44. The transmitter of claim 43 wherein the range parameter determining means determines the new message range parameter R0(n+1) based upon a new message range parameter R0(n) for an upstream data frame n just received, based upon the total number of stations in a network, based upon a number of new message minislots MS0(n) in the upstream data frame n just received, based upon MS0(n+1), and based upon a number of collided new message minislots MS0(n) in the upstream data frame n just received.

45. The transmitter of claim 42 wherein the minislot parameter determining means determines the new message minislots MS0(n+1) and the old message minislots MS1(n+1) based upon MS(n+1).

46. The transmitter of claim 45 wherein the range parameter determining means determines the new message range parameter R0(n+1) based upon a new message range parameter R0(n) for an upstream data frame n just received, based upon the total number of stations in a network, based upon a number of new message minislots MS0(n) in the upstream data frame n just received, based upon MS0(n+1), and based upon a number of collided new message minislots MS0(n) in the upstream data frame n just received.

47. The transmitter of claim 35 wherein the range parameter determining means determines the old message range parameter R1(n+1) based upon a number of collided minislots in the upstream data frame n just received.

48. The transmitter of claim 47 wherein the minislot parameter determining means determines minislots MS(n+1) based upon reservation request activity.

49. The transmitter of claim 48 wherein the minislot parameter determining means determines the new message minislots MS0(n+1) and the old message minislots MS1(n+1) based upon R1(n+1) and MS(n+1).

50. The transmitter of claim 49 wherein the range parameter determining means determines the new message range parameter R0(n+1) based upon a number of collided minislots in the upstream data frame n just received.

51. The transmitter of claim 48 wherein the minislot parameter determining means determines the new message minislots MS0(n+1) and the old message minislots MS1(n+1) based upon MS(n+1).

52. The transmitter of claim 51 wherein the range parameter determining means determines the new message range parameter R0(n+1) based upon a number of collided minislots in the upstream data frame n just received.

* * * * *